United States Patent [19]
Assaf

[11] Patent Number: 5,966,732
[45] Date of Patent: Oct. 12, 1999

[54] METHOD AND APPARATUS FOR ADDING TO THE RESERVE AREA OF A DISK DRIVE

[75] Inventor: Mahmoud Assaf, Sioux City, Iowa

[73] Assignee: Gateway 2000, Inc., North Sioux City, S. Dak.

[21] Appl. No.: 08/753,885

[22] Filed: Dec. 2, 1996

[51] Int. Cl.⁶ .................................................. G06F 12/00
[52] U.S. Cl. ............................... 711/170; 369/59; 711/4; 711/112; 711/163; 380/4; 395/188.01; 395/829; 395/825; 395/186
[58] Field of Search .................................. 369/59; 711/4, 711/170, 112, 163; 380/4; 395/188.01, 829, 825, 186

[56] References Cited

U.S. PATENT DOCUMENTS

| | | | |
|---|---|---|---|
| 4,458,273 | 7/1984 | Johnson | 360/74.1 |
| 4,562,495 | 12/1985 | Bond et al. | 360/78 |
| 4,608,618 | 8/1986 | Sturtevant-Stuart | 360/135 |
| 4,633,393 | 12/1986 | Rundell | 364/200 |
| 4,755,892 | 7/1988 | Carteau et al. | 360/75 |
| 4,791,623 | 12/1988 | Deiotte | 369/59 |
| 4,835,448 | 5/1989 | Dishner et al. | 318/254 |
| 4,907,216 | 3/1990 | Rijnsburger | 369/275 |
| 4,970,610 | 11/1990 | Knappe | 360/75 |
| 5,018,095 | 5/1991 | Nissimov | 711/4 |
| 5,027,396 | 6/1991 | Platteter et al. | 380/4 |
| 5,170,299 | 12/1992 | Moon | 360/77 |
| 5,191,269 | 3/1993 | Carbolante | 318/254 |
| 5,191,270 | 3/1993 | McCormack | 318/254 |
| 5,202,616 | 4/1993 | Peters et al. | 318/254 |
| 5,210,474 | 5/1993 | Oswald | 318/254 |
| 5,216,343 | 6/1993 | Genheimer et al. | 318/568 |
| 5,221,881 | 6/1993 | Cameron | 318/254 |
| 5,225,759 | 7/1993 | Endo et al. | 318/778 |
| 5,245,256 | 9/1993 | Cassat et al. | 318/524 |
| 5,247,633 | 9/1993 | Nissimov et al. | 711/4 |
| 5,319,290 | 6/1994 | Yoshino et al. | 318/254 |
| 5,323,094 | 6/1994 | Kaneda et al. | 318/254 |
| 5,339,319 | 8/1994 | Yamane et al. | 371/10.2 |
| 5,375,243 | 12/1994 | Parzych et al. | 395/188.01 |

(List continued on next page.)

FOREIGN PATENT DOCUMENTS

| | | |
|---|---|---|
| 0695986 | 2/1996 | European Pat. Off. . |
| WO91/00594 | 1/1991 | WIPO . |
| WO94/22134 | 9/1994 | WIPO . |
| WO/96/26487 | 8/1996 | WIPO . |

OTHER PUBLICATIONS

"Information Technology—AT Attachment—4 with Packet Interface Extension (ATA/ATAPI–4)", *Proposal; Revision 5,* Technical Editor Peter T. Mclean, Maxtor Corp., 246 pgs, (Jun. 28, 1996).

K. Schultz, "The Ultimate Utility Guide: Antivirus Utilities", *PC Magazine,* 143–5, 147–8, 153–4, 156, 158, 161 (May 14, 1996).

*Primary Examiner*—John W. Cabeca
*Assistant Examiner*—Fred F. Tzeng
*Attorney, Agent, or Firm*—Schwegman, Lundberg Woessner & Kluth P.A. & Anthony Claiborne

[57] ABSTRACT

A computer system having a monitor, disk drive, and central controller is disclosed. The computer manufacturer uses a method for expanding the reserve area of a disk drive to allow computer systems manufacturers to change the storage capacity of the reserve area. The method includes setting up a password with the disk drive manufacturer to enable two commands. One command reads the maximum address or largest track number that the user has access to. The second command allows for setting a new maximum address to which the user has access. The firmware of the disc drive is updated with the new maximum address. Once the two commands have been used to expand the reserve area, the computer system manufacturer can add critical data, and critical program instructions to the expanded or new reserve area. The computer manufacturer may decide to store a portion of a virus scan program in the expanded reserve area, or store a portion of the basic input output system (BIOS) so that a smaller BIOS read only memory (ROM) can be used for the computer system, or the computer manufacturer can store emergency boot up instructions in the reserve area in the event there is damage to the disk.

15 Claims, 5 Drawing Sheets

U.S. PATENT DOCUMENTS

| | | | |
|---|---|---|---|
| 5,397,972 | 3/1995 | Maiocchi | 318/439 |
| 5,422,762 | 6/1995 | Jerbic | 360/48 |
| 5,455,885 | 10/1995 | Cameron | 388/834 |
| 5,471,353 | 11/1995 | Codilian et al. | 360/73 |
| 5,511,227 | 4/1996 | Jones | 395/829 |
| 5,530,960 | 6/1996 | Parks et al. | 395/825 |
| 5,657,445 | 8/1997 | Pearce | 395/186 |

| COMMAND BLOCK OUTPUT REGISTERS | 7 | 6 | 5 | 4 | 3 | 2 | 1 | 0 |
|---|---|---|---|---|---|---|---|---|
| REGISTER | | | | | | | | |
| DATA | - | - | - | - | - | - | - | - |
| FEATURE | - | - | - | - | - | - | - | - |
| SECTOR COUNT | - | - | - | - | - | - | - | - |
| SECTOR NUMBER | - | - | - | - | - | - | - | - |
| CYLINDER LOW | - | - | - | - | - | - | - | - |
| CYLINDER HIGH | - | - | - | - | - | - | - | - |
| DEVICE/HEAD | 1 | L | 1 | D | - | - | - | - |
| COMMAND | 1 | 1 | 1 | 1 | 0 | 0 | 0 | 0 |

FIG. 3

| COMMAND BLOCK INPUT REGISTERS | 7 | 6 | 5 | 4 | 3 | 2 | 1 | 0 |
|---|---|---|---|---|---|---|---|---|
| REGISTER | | | | | | | | |
| DATA | - | - | - | - | - | - | - | - |
| ERROR | - | - | - | - | - | - | - | - |
| SECTOR COUNT | - | - | - | - | - | - | - | - |
| SECTOR NUMBER | V | V | V | V | V | V | V | V |
| CYLINDER LOW | V | V | V | V | V | V | V | V |
| CYLINDER HIGH | V | V | V | V | V | V | V | V |
| DEVICE/HEAD | - | - | - | - | H | H | H | H |
| STATUS | | | | | | | | |

FIG. 4

| ERROR REGISTER | 7 | 6 | 5 | 4 | 3 | 2 | 1 | 0 |
|---|---|---|---|---|---|---|---|---|
| | BBK | UNC | 0 | IDN | 0 | ABT | TON | AMN |
| | 0 | 0 | 0 | 0 | 0 | V | 0 | 0 |

FIG. 5

| STATUS REGISTER | 7 | 6 | 5 | 4 | 3 | 2 | 1 | 0 |
|---|---|---|---|---|---|---|---|---|
| | BSY | RDY | DWF | DSC | DRQ | COR | IDX | ERR |
| | 0 | V | 0 | - | - | 0 | - | V |

| COMMAND BLOCK OUTPUT REGISTERS | | | | | | | | |
|---|---|---|---|---|---|---|---|---|
| REGISTER | 7 | 6 | 5 | 4 | 3 | 2 | 1 | 0 |
| DATA | – | – | – | – | – | – | – | – |
| FEATURE | – | – | – | – | – | – | – | B |
| SECTOR COUNT | – | – | – | – | – | – | – | – |
| SECTOR NUMBER | V | V | V | V | V | V | V | V |
| CYLINDER LOW | V | V | V | V | V | V | V | V |
| CYLINDER HIGH | V | V | V | V | V | V | V | V |
| DEVICE/HEAD | 1 | L | 1 | D | V | V | V | V |
| COMMAND | 1 | 1 | 1 | 1 | 1 | 0 | 0 | 1 |

FIG. 8

| COMMAND BLOCK INPUT REGISTERS | | | | | | | | |
|---|---|---|---|---|---|---|---|---|
| REGISTER | 7 | 6 | 5 | 4 | 3 | 2 | 1 | 0 |
| DATA | – | – | – | – | – | – | – | – |
| ERROR | – | – | – | – | – | – | – | – |
| SECTOR COUNT | – | – | – | – | – | – | – | – |
| SECTOR NUMBER | V | V | V | V | V | V | V | V |
| CYLINDER LOW | V | V | V | V | V | V | V | V |
| CYLINDER HIGH | V | V | V | V | V | V | V | V |
| DEVICE/HEAD | – | – | – | – | – | H | H | H |
| STATUS | | | | | | | | |

FIG. 9

| ERROR REGISTER | | | | | | | | |
|---|---|---|---|---|---|---|---|---|
| 7 | 6 | 5 | 4 | 3 | 2 | 1 | 0 |
| BBK | UNC | 0 | IDN | 0 | ABT | TON | AMN |
| 0 | 0 | 0 | 0 | 0 | V | 0 | 0 |

FIG. 10

| STATUS REGISTER | | | | | | | | |
|---|---|---|---|---|---|---|---|---|
| 7 | 6 | 5 | 4 | 3 | 2 | 1 | 0 |
| BSY | RDY | DWF | DSC | DRQ | COR | IDX | ERR |
| 0 | V | 0 | – | – | 0 | – | V |

METHOD AND APPARATUS FOR ADDING TO THE RESERVE AREA OF A DISK DRIVE

FIELD OF THE INVENTION

The present invention relates to storage devices. More specifically, the present invention relates to a method and apparatus for modifying the reserve area of a disk drive.

BACKGROUND OF THE INVENTION

A standard disk drive includes space for storing data available to the user and a fixed amount of space that is kept in reserve for storing data unavailable to the user. After the manufacturer writes a servo pattern on the disk or disks in a disk drive, the manufacturer fixes the amount of space that is available to the user and the amount of space that is unavailable to the user. Servo writing the disks in the disk drive provides positional information for finding a particular track or group of tracks. The manufacturer then designates that a certain number of tracks will be set aside for the reserve area. The manufacturer then writes certain critical information to the tracks in the reserve area. The critical information is typically required to operate the disk drive and is used by the operating system or hardware in the operation of the drive. In the past, no one beyond the original disk drive manufacturer could access the reserve area. The reserve area was simply protected. The reserve area was even off limits to a computer system manufacturer that integrated the disk drive into a computer system. In the past, a computer system manufacturer could not modify or change the size of the reserve area. No such command or set of commands would allow anyone beyond the manufacturer of the disk drive to change anything with respect to the reserve area as set up by the manufacturer.

The disk drive is basically a nonvolatile source of memory. In other words, after the power is removed from the disk drive, the disk drive maintains the information stored thereon indefinitely. The storage capacity of disk drives has risen dramatically over the past few years and the cost of that storage capacity, commonly priced as the cost per megabyte of disk drive storage has dropped dramatically. The result is that now disk drives have become an attractive alternative to nonvolatile storage in a ceramic chips or integrated circuits, since the cost of storage on a disk drive is much less expensive and since disk drives are already included in most computer systems as one rarely sees a computer system without a disk drive.

The only option at present for computer system manufacturers seeking to write information to a disk rather than to a ROM, is to write to an area of the disk to which the user has access. This option is simply unacceptable, since critical information written to this area of the disk could be overwritten at anytime. Overwriting would be the same as erasing the critical data written to the disk. Overwriting or erasure would have devastating effects. Basic instructions necessary to operate the computer system would be erased leaving the user with useless hardware. In addition, viruses downloaded from other sources such as the Internet, could attack critical information written to an area of the disk to which users have access. Although writing critical information to a disk is currently an attractive alternative from a perspective of cost, computer system manufacturers will not write such information to a disk since one could potentially overwrite any critical information written on the disk. There is no current way to modify the disk drive so that a computer manufacturer will be assured that information written to a disk will not be overwritten or erased. There is a need to reduce the cost of computer systems. There is also a need to provide safe and low cost nonvolatile storage of system manufacturer related critical information used to operate computer systems.

SUMMARY OF THE INVENTION

The present invention teaches a method for expanding the reserve area of a disk drive to allow computer system manufacturers to change the storage capacity of he reserve area. The reserve area is not capable of being accessed by users or of being overwritten. The method includes setting up a password with the disk drive manufacturer to enable two commands. One command reads the maximum address or largest track number that the user has access to. The second command allows for setting a new maximum address to which the user has access. The new maximum address must be lower than or equal to the maximum address the original disk drive manufacturer initially fixed for the maximum address for user accessible data. This assures that the reserve area set up by the disk drive manufacturer is never accessible by the user and that the data written to the original reserve area will not be inadvertently erased thereby preserving information critical to the operation of the disk drive. This prevents partial or complete incapacitation of the disk drive.

Computer system manufacturers now realize that they can reduce the cost of systems without appreciably reducing reliability or quality of the computer system by reducing the size of nonvolatile read only memories (ROMs) and storing a portion of the information formally stored in a ROM on the less expensive disk drive. In addition, other critical information is written to the additional non user accessible reserve area to enhance the reliability and performance of the computer system. Once the two commands have been used to expand the reserve area, the computer system manufacturer can add critical data, and critical program instructions to the expanded or new reserve area. For example, the computer manufacturer may decide to store a portion of a virus scan program in the new reserve area, or a portion of the basic input output system (BIOS) so that a smaller BIOS read only memory (ROM) can be used for the computer system.

BRIEF DESCRIPTION OF THE DRAWINGS

FIG. 3 is a block diagram illustrating the fields of a read native max command.

FIG. 4 is a block diagram illustrating the fields of a response to the read native max command.

FIG. 5 is a block diagram illustrating the fields for an error register in the response to the read native max command.

FIG. 6 is a block diagram illustrating the fields for a status register in the response to the read native max command.

FIG. 7 is a block diagram illustrating the fields of a set max LBA/CYL command.

FIG. 8 is a block diagram illustrating the fields of a response to the set max LBA/CYL command.

FIG. 9 is a block diagram illustrating the fields for the error register in the response to the set max LBA/CYL command.

FIG. 10 is a block diagram illustrating the fields for the status register in the response to the set max LBA/CYL command.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
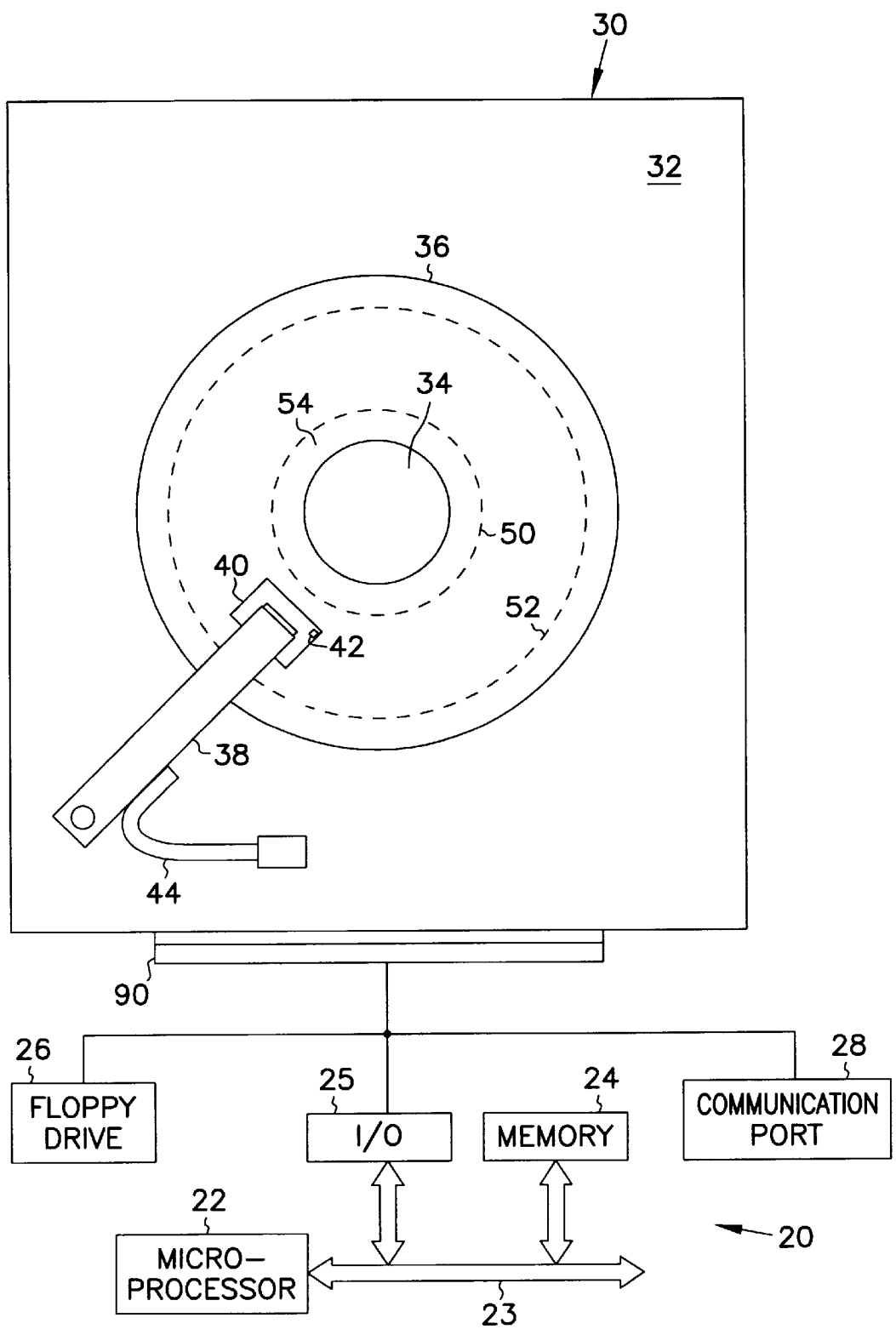
FIG. 1 is a schematic diagram of a computer system including a disk drive.

In FIG. 1, a computer system 20 includes a disk drive 30. The computer system 20 also comprises a microprocessor 22 having a data and instruction bus 23 for passing commands and data. A memory 24 and an input/output controller 25 are attached to the data and instruction bus 23. Attached to the input/output controller 25 is a floppy drive 26, a communications port 28 and a disk drive 30. The disk drive 30 shown is a hard or rigid disk drive. The rigid disk drive includes a housing 32 which typically includes a base plate and a cover which form a controlled environment called a disk enclosure. A spindle 34 is attached to the housing. Attached to the spindle 34 is a rigid disk 36. The spindle 34 is capable of rotation and rotates the disk 36 during operation. Also attached to the housing 32 is an actuator arm 38. In FIG. 1, the actuator arm is shown as rotatably attached to the housing 32, however, an actuator arm can also be attached to the housing 32 so that linear motion is achieved. Attached at the end of the actuator arm 38 is a slider 40 which carries a transducer 42. The slider 40 passes over the disk 36 and places the transducer in transducing relationship to the disk 36. The disk 36 includes a multiplicity of tracks which are typically invisible to the naked eye. The actuator arm 38 is moved and controlled to place the transducer 42 over a particular desired track and then maintain the transducer 42 over the desired track until desired information is read from or written to the desired track. In the case of reading information from the track on the disk 36, the transducer is electrically connected to circuitry 44 for amplifying the signal, decoding the signal and transferring the signal to a connector 90. The electrical circuitry 44 typically includes a circuit board which contains processing circuitry, firmware and other hardware.

An inner track 50 and an outer track 52 are shown as dotted concentric circles on the disk in FIG. 1. The reason these are shown as dotted circles are that the tracks are typically invisible to the naked eye. The inner track 50 and the outer track 52 are just two of a multiplicity of tracks. The tracks located between the inner track 50 and the outer track 52 represent an area of the disk to which a user has access. The outer track is numbered track zero (track 0), the tracks are then numbered consecutively so that the higher numbered tracks are located closer to the center of the disk 36. It should be noted that when a disk drive contains more than one disk, the tracks that share the same number are at about the same distance from the center of the spindle. The tracks having the same number are then said to form a cylinder. The various tracks would be circles on the cylinder.

A reserve area 54, which the user can not access, can be located anywhere on the disk 36. The most common location for a reserve area is toward the center diameter of the disk inside of the inner track of the area to which the user has access. Accordingly, the reserve area 54 is shown inside the inner track 50 on the disk 36. The reason that this is the most common portion of the disk on which to have a reserve area is that these tracks hold the least amount of information per track. Since the inner tracks hold less data or information per track they are also in smaller increments. When adding information to the reserve area, the computer manufacturer will determine the size of the information they wish to add. The capacity of all the added tracks for the reserve area will have to be equal to or greater than the size of information to be added to the reserve area. Typically, the computer system manufacturer will add tracks until the amount of storage capacity exceeds the size of the information to add. It should be noted that the tracks capable of holding more information are more valuable in terms of storage available to the user. The tracks capable of holding more information also occur in larger increments. If an additional track is needed to provide enough capacity to meet the capacity desired to be added to the new reserve area, using the tracks having smaller capacity will waste less capacity otherwise available for the user.

This invention provides a set of commands and a method to allow a computer system manufacturer to modify the size of the reserve area 54. The set of commands may be enabled by a password set up between the disk drive manufacturer and the computer system manufacturer. The password typically is a command that means nothing to the disk drive other than to allow execution of certain commands as discussed below. By executing the commands, the reserve area 54 is expanded by reducing the highest track number to which the user has access. This effectively moves the inner band 50 away from the center of the disk 36 to make the reserve area 54 larger and make the portion of the disk accessible to the user (the area between the inner band 50 and the outer band 52) smaller.

The two commands used are READ NATIVE MAX LBA/CYL command and the SET MAX LBA/CYL. The READ NATIVE MAX LBA/CYL command is akin to a status check of the current parameters that have been set for the disk drive. The READ NATIVE MAX LBA/CYL command is the request for the status information. The RESPONSE to this command includes the actual status.

The SET MAX LBA/CYL command is the command that requests a new or different maximum cylinder or logical block address. In other words, this is the command which resets the boundary between the user accessible area and the reserve area or negative cylinders to which the user does not have access.

In rare instances, the reserve area 54 can be reduced by increasing the highest track number to which the user has access. This effectively moves the inner band 50 toward the center of the disk 36 to make the reserve area 54 smaller and make the portion of the disk accessible to the user (the area between the inner band 50 and the outer band 52) larger. Of course it should be noted that the manufacturer of a disk drive sets up the size of the original reserve area and stores critical data in the original reserve area which is necessary to operate the disk drive. Thus the modifications will not reduce the size of the reserve area to an area that is smaller than the original reserve area as set up by the manufacturer of the disk drive. This prevents overwriting of critical information written to the original reserve area by the original equipment manufacturer.

Two commands are enabled with a password which is set up between the disk drive manufacturer and the computer system manufacturer. Typically the computer system manufacturer must specify the type of password which is to be recognized.

Figure 2A:
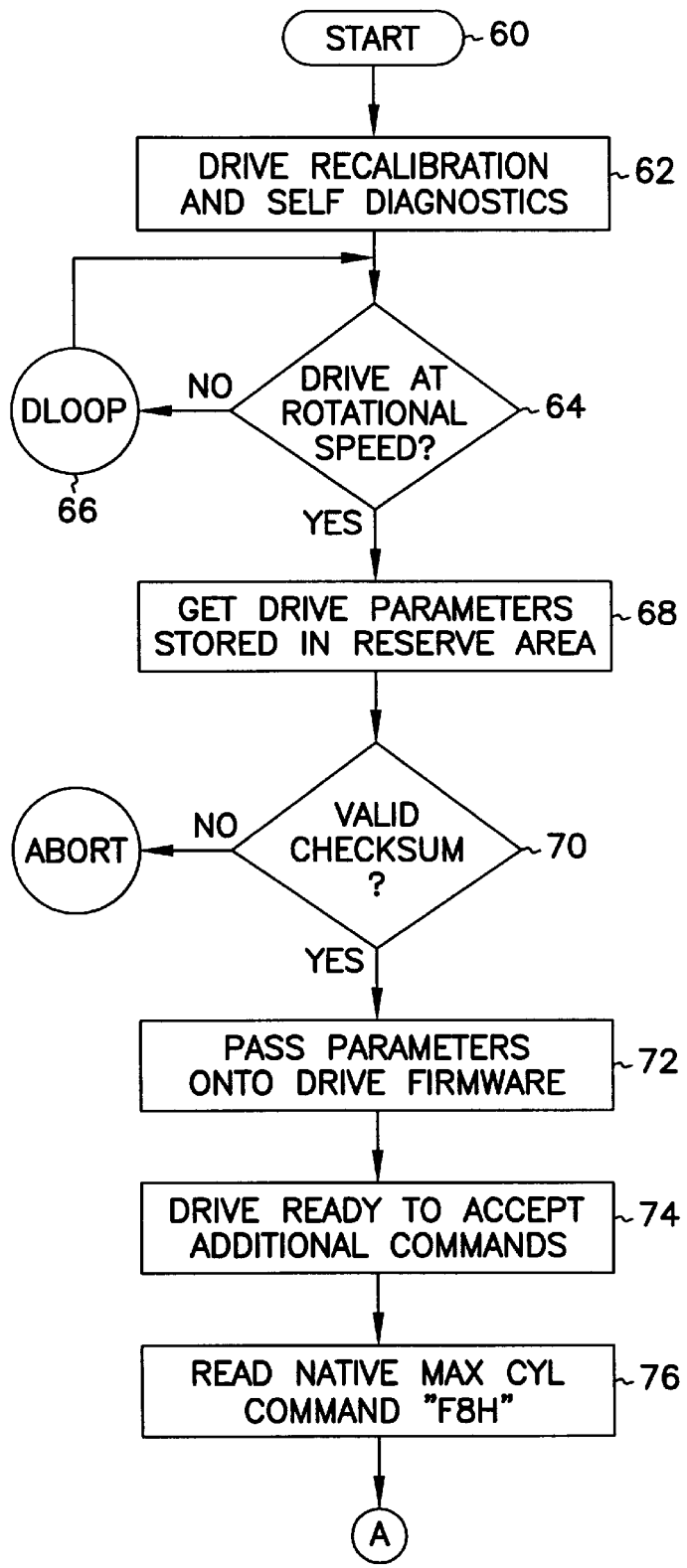
FIGS. 2A and 2B are flow charts of the operation of the disk drive as the disk drive executes commands to expand the reserve area on the disk drive.

Now turning to FIGS. 2A–2C, the various steps necessary to implement this invention will be described in more detail with the aid of the flowchart shown in these figures.

The disk drive 30 is started as depicted by step 60. Once started, the drive goes through drive recalibration and a series of self diagnostics, as depicted by step 62, to test itself and then as the drive warms up, the drive recalibrates various settings within the drive, such as position error signals and other such features. Once the drive has gone through its self diagnostics and recalibration, the drive checks its rotational speed at decision box 64. If the drive is not at its rotational speed, the drive does a loop 66 and rechecks the rotational speed. The loop is depicted by a circle 66 in the flow chart. Once the disk drive has achieved rotational speed, the drive gets the drive parameters that are stored in the negative cylinders or the reserve area, as depicted by box 68. An additional sum, called a checksum, is calculated and stored with the original disk drive parameters. Upon reading the original parameters, the checksum is then recalculated and compared to the original checksum. If the checksum is valid, as depicted by decision box 70, the drive parameters are passed onto the drive firmware as depicted by box 72. Once the drive parameters are passed onto the drive firmware, the drive is ready to accept additional commands as shown in step 74 of the flow chart. Firmware is that part of software that usually cannot be easily changed. Firmware consists of microprograms that are contained in ROM. Firmware tends to be for specific hardware and offers software-type implementation techniques for that hardware. Firmware is generally limited to moving data through the data paths and functional units already present; and is able to effectively process only the instruction formats, data types, and arithmetic modes that are defined for the specific hardware for which it is written.

The additional command that is accepted is Read Native Max Cylinder (READ NATIVE MAX LBA/CYL) which is identified by the hexadecimal form of an F and an 8 as shown in box 76 of the flow chart. The command is checked for validity to see if the command is supported by the disk drive's hardware and firmware at decision box 78. If it is not supported, the operation aborts. If it is supported and it is a valid command, the disk drive returns the drive parameters to the host computer as shown in box 80. The drive parameters are returned in the RESPONSE to the READ NATIVE MAX LBA/CYL. The particulars of these commands will be discussed with respect to FIGS. 3–6.

Another command, as depicted by Box 82, which is issued is the Set Max Cylinder command invoked by the hexadecimal F9. This is the command is used to set a new maximum cylinder or track number. A reduction in the maximum track number reduces the area to which users have access and increases the reserve area to which the users do not have access. This command is checked for validity at decision box 84. If the command is invalid, the operation aborts. If the command is valid and it is supported by the disk drive's hardware and firmware, the new parameters are passed to the drive firmware as shown in box 86.

The computer system manufacturer can load other information into the reserve area which is not user accessible and is inexpensive nonvolatile storage. Such information comprises data and programs. Any information or sets of instructions can be loaded into the added reserve area. Some of the uses include adding a portion of the BIOS (Basic Input Output System) to the enlarged reserve area. BIOS is usually stored in other nonvolatile hardware such as a BIOS RAM. By off loading some of the BIOS to the reserve area, a smaller capacity, nonvolatile RAM can be used in the computer system. This saves manufacturers and users money since the nonvolatile disk drive space is less expensive than nonvolatile RAM.

Another additional use of the added reserve area comprises storing emergency boot up instructions. The boot up instructions are those necessary to start up a computer system. These are typically stored on a floppy or a hard disk. More common is to store these on a hard disk drive. If the disk of the hard disk drive gets damaged in the area where the boot up instructions are located, then the emergency boot up instructions in the reserve area can be used. Previously, users had to look for the floppy disks that held the boot-up instructions before they could get restarted. If it is necessary to use the emergency boot up instructions, the disk drive indicates such necessity to the host. Such necessity also indicates that there may have been some disk damage.

Another use of the added reserve area is for storing virus scan or virus detection software. With virus scanning or detecting software in the reserve area and therefore resident on the disk, the disk drive hardware or firmware checks for viruses periodically or after a certain amount of time after having not received a command. In an alternative embodiment, the system scans files before they are saved to the disk. In yet a further embodiment predictive failure information is added by the computer system or to the added reserve area 54.

FIGS. 3–10, detail of the READ NATIVE MAX LBA/CYL and the SET MAX LBA/CYL commands and the responses to these commands It should be noted at the outset, that all these commands and the responses thereto are in a format specifically required for a drive that operates with a standard IDE interface. Specifically, the commands are known as ATA commands. In other words, passing the commands and responses across an industry standard interface dictates that the commands are of a specific format which is dictated by the industry standard for ATA commands. One of ordinary skill in art could adapt these commands to use other industry standard interfaces such as SCSI, or SCSI II. The ATA command format is for the IDE drives, and is set forth here merely as an illustrative example with respect to other formats.

READ NATIVE MAX LBA/CYL Command:

Now turning specifically to FIG. 3, the details of the READ NATIVE MAX LBA/ CYL command will be discussed. There are commands that govern AT attachment which are known as the ATA commands. Communication to or from any device, such as this disk drive, is through an I/O Register that routes the input or output data to or from registers associated with the ATA command block. The Command Block Registers are used for sending commands to the device or posting status from the device. The Control Block Registers are used for device control and to post alternate status. The command block registers include ten, 8-bit registers. The ten registers are for DATA, FEATURE, SECTOR COUNT, SECTOR NUMBER. CYLINDER LOW, CYLINDER HIGH, DEVICE/HEAD, COMMAND, STATUS, AND ERROR.

ATA commands being written to devices and status being read from the devices is done through ten 8-bit registers that form the ATA Command Block. Each register is addressed by using the signals from the host (CS0-, CS1-, DA2, DA1, DA0, DIOR- and DIOW-). When writing a command to a device, the contents that have been written to the Data, Features, Sector Count, Sector Number, Cylinder Low, Cylinder High and Device/Head registers are treated as parameters of the command that is written to the Command register. Command processing begins when the Command register is written to. All the registers, except the command register, act as parameters for the command. Basically, the parameters are set first and then the command is issued.

The details of the READ NATIVE MAX ADDRESS command will be discussed. For this command, the Data, Features, Sector Count, Sector Number, Cylinder Low and Cylinder High registers are not used and therefore, do not need to be initialized. The command (F8h) is written to the Command register after first writing a value into the Device/Head register. The value written to the Device/Head register indicates which device should respond to the command and whether the MAX ADDRESS returned should be reported as an LBA (Logical Block Address) value or as a CHS (Cylinder-Head-Sector) value.

The DEVICE/HEAD register defines which drive (slave or master) and the mode in which the drive operates (LBA mode is Logical Block Address Mode). All eight bits of the 8-bit COMMAND register specify the command. The first four bits of the COMMAND for the READ NATIVE MAX LBA/CYL command are 1111. The second four bits COMMAND for the READ NATIVE MAX LBA/CYL command are 1000. Four bits can be arranged in sixteen different ways which gives rise to the term hexadecimal. The hexadecimal which historically is equal to a "fox" or F is the combination with a 1111. The hexadecimal which historically is equal to a 8 is the combination with a 1000. Two hexadecimals define an eight bit register. The first four of the COMMAND for the READ NATIVE MAX LBA/CYL command equal the hexadecimal F and the last four equal the hexadecimal 8. Thus, the command is termed an F8 command.

Figure 2B:
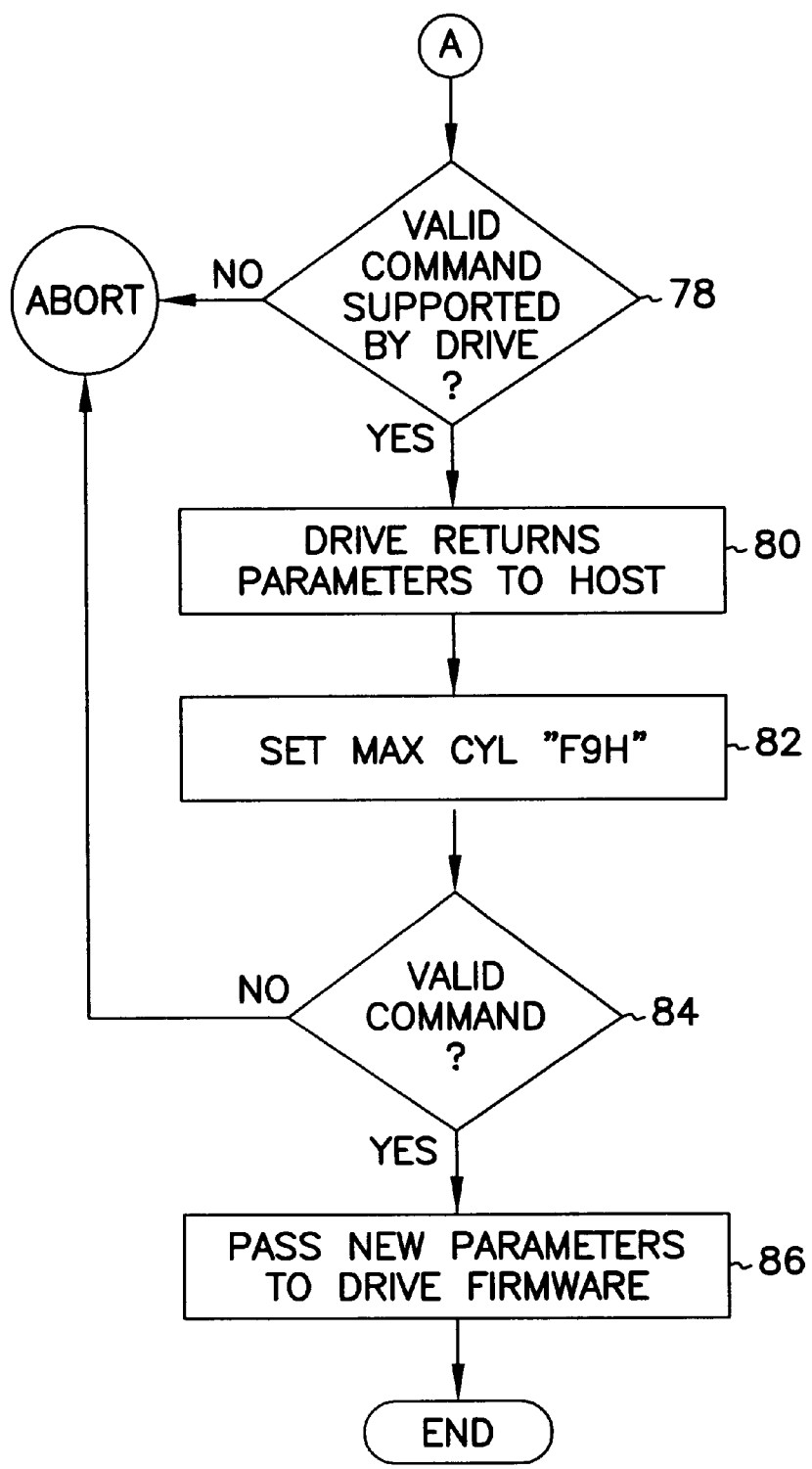

RESPONSE TO THE READ NATIVE MAX LBA/CYL command:

If the READ NATIVE MAX LBA/CYL command is considered valid, the drive returns the parameters to the host, as shown in step 80 of FIG. 2B. The returned parameters are set forth in the RESPONSE TO THE READ NATIVE MAX LBA/CYL. The RESPONSE TO THE READ NATIVE MAX LBA/CYL command is in the format of any ATA command block which is a matrix of eight, 8-bit registers. Each 8-bit register is not used in the RESPONSE TO THE READ NATIVE MAX LBA/CYL command. As shown in FIG. 4, the command block for the RESPONSE TO THE READ NATIVE MAX LBA/CYL includes eight, 8-bit registers for DATA, ERROR, SECTOR COUNT, SECTOR NUMBER, CYLINDER LOW, CYLINDER HIGH, DEVICE/HEAD, and STATUS.

The 8-bit registers for DATA, ERROR, SECTOR COUNT are not used in the RESPONSE TO THE READ NATIVE MAX LBA/CYL command returned to the host. The host only reads the parameters from the 8-bit registers for the SECTOR NUMBER, CYLINDER LOW, CYLINDER HIGH, and the last four bits of the DEVICE/HEAD register. The values are typically ones and zeros that convey a particular Sector Number, a particular cylinder for Cylinder Low and a particular cylinder for Cylinder High and MAX HEAD Number.

Once the max LBA/CYLINDER parameters are obtained, the device or disk drive places the parameters into the 8-bit registers for SECTOR NUMBER, CYLINDER HIGH, CYLINDER LOW, and DEVICE/HEAD. Once these parameters are in these registers, the status bit indicating that the command is complete and the DMA is ready is then set. The host then reads the parameters from the registers.

The ERROR REGISTER/Field

The ERROR register is used in the RESPONSE TO THE READ NATIVE MAX LBA/CYL command when an error is detected while executing the command. The error register is shown blank in FIG. 4. In actuality, the error register shown in FIG. 4 may be filled. The error register is an 8 bit register. Each bit of the 8 bit register indicates a specific error as shown in FIG. 5. Each of the bits in the registers of the error register indicates a particular type of error.

The STATUS REGISTER/Field

The STATUS register is another 8 bit register as shown in FIG. 6. The bits in status register change while the RESPONSE TO THE READ NATIVE MAX LBA/CYL command are filled and changed while different parameters in the other registers are being filled. As mentioned above, the host polls the status with respect to fulfilling the command and the bits in the 8 bit STATUS register convey this information. The 8 bit status register is shown blank in FIG. 4, but is detailed in FIG. 6. Each of the bits in the STATUS REGISTER indicates the type of status as is shown in FIG. 6.

Listed below are various parameters associated with the READ NATIVE MAX LBA/CYL command and the RESPONSE TO THE READ NATIVE MAX LBA/CYL command. The parameters associated with the READ NATIVE MAX LBA/CYL command are listed as Output Parameters to the Drive.

The parameters associated with the RESPONSE TO THE READ NATIVE MAX LBA/CYL command are the remaining parameters listed. Specifically, the parameters associated with the RESPONSE TO THE READ NATIVE MAX LBA/CYL, command are the Input Parameters from the Drive, parameters associated with the Error Registers, and parameters associated with the Status registers.

Output Parameters to the Drive

| | |
|---|---|
| L | LBA mode. Indicates the addressing mode. L=0 specifies CHS mode and L=1 does LBA addressing mode. |
| D | Drive. When D=0, Drive 0 (Master) is selected. When D=1, drive 1 (Slave) is selected. |
| V | Valid. Indicates that the bit is part of an output parameter and should be specified. |
| — | Indicates that the bit is not used. |

Input Parameters From The Drive

| | |
|---|---|
| Sector Number | In LBA mode, This register contains Native Max LBA bits 0–7. (L=1) |
| | In CHS mode, this register contains Native Max sector number. (L=0) |
| Cylinder High/Low | In LBA mode, this register contains native Max LBA bits 8 → 15 (low), 16 → 23 (high), (L=1) |
| | In CHS mode, this register contains native max cylinder number. (L=0) |
| DEVICE/HEAD | In LBA mode, this register contains native Max LBA bits 24 → 27. (L=1) |
| | In CHS mode, this register contains native max head number. (L=0) |
| V | Valid, indicates that the bit is part of an output parameter and should be specified. |
| — | Indicates that the bit is not used. |

Error Registers

| | |
|---|---|
| ABT | Aborted command, ABT=1 indicates the requested command has been aborted due to a drive status error or an invalid parameter in an output register. |

Status Registers

| | |
|---|---|
| RDY | Drive ready, RDY=1 indicates that the drive is capable of responding to a command, RDY will be set to 0 during power on until the drive is ready to accept a command. IF the drive detects an error while processing a command, RDY is set to 0 until the status register is read by the Host, at which time RDY is set back to 1. |
| ERR | Error, ERR=1 indicates that an error occurred during execution of the previous command. The Error Register should be read to determine the error type. The drive sets ERR=0 when the next command is received from the Host. |

Once the RESPONSE TO THE READ NATIVE MAX LBA/CYL command is received by the host, the SET MAX CYL command can be issued by the host to the disk drive.

SET MAX CYL Command

Once the RESPONSE TO THE READ NATIVE MAX LBA/CYL command is received by the host, the SET MAX LBA/CYL command can be issued by the host to the disk drive. This command set overwrites the maximum logical block address or maximum cylinder (LBA/CYL) of the disk drive to reset the drive capacity available to the user and increase or decrease the reserve space or the capacity unavailable to the user. Once the command is received and the drive parameters are modified, then all accesses beyond the maxium logical block address or cylinder (LBA/CYL) of the disk drive are rejected by setting an abort bit which is one of the 8 bits in the Error Register (shown in FIG. 9).

Now turning specifically to FIG. 7, the details of the SET MAX CYL command will be discussed. As mentioned before with respect to the Read Native Max command, there are commands that govern AT attachment which are known as the ATA commands. Communication to or from any device, such as this disk drive, is through an I/O Register that routes the input or output data to or from registers associated with the ATA command block. The Command Block Registers are used for sending commands to the device or posting status from the device. The Control Block Registers are used for device control and to post alternate status. The command block registers include ten, 8-bit registers. The ten registers are for DATA, FEATURE, SECTOR COUNT, SECTOR NUMBER, CYLINDER LOW, CYLINDER HIGH, DEVICE/HEAD, COMMAND, STATUS, AND ERROR.

ATA commands being written to devices and status being read from the devices is done through ten 8-bit registers that form the ATA Command Block. Each register is addressed by using the signals from the host (CS0-, CS1-, DA2, DA1, DA0, DIOR- and DIOW-). When writing a command to a device, the contents that have been written to the Data, Features, Sector Count, Sector Number, Cylinder Low, Cylinder High and Device/Head registers are treated as parameters of the command that is written to the Command register. Command processing begins when the Command register is written to. All the registers, except the command register, act as parameters for the command. Basically, the parameters are set first and then the command is issued.

The details of the SET MAX CYL command will now be discussed. For this command the DATA and FEATURE registers are not used and therefore, do not need to be intitialized. The SECTOR COUNT, SECTOR NUMBER, CYLINDER LOW, and CYLINDER HIGH are each 8-bit registers used to set the parameters of the SET MAX CYL command. The bits in these 8-bit registers are set before the SET MAX CYL command is run. The bits of the SECTOR COUNT, SECTOR NUMBER, CYLINDER LOW, and CYLINDER HIGH are used in the SET MAX CYL command to specify the value of the new highest cylinder to which the user has access to. The DEVICE/HEAD register is used to define the type of drive (slave or master) and the mode in which the drive operates (LBA mode is Logical Block Address Mode). One bit of the SECTOR COUNT register is used to indicate whether the selection will be nonvolatile or volatile. In other words, if this is a temporary selection or a permanent selection.

All eight bits of the 8-bit COMMAND register are used to specify the command. The first four bits of the COMMAND for the SET MAX CYL command are 1111. The second four bits of the COMMAND for the SET MAX CYL command are 1001. Four bits or fields can be arranged in sixteen different ways which gives rise to the term hexadecimal. The hexadecimal which historically is equal to a "fox" or F is the combination with a 1111. The hexadecimal which historically is equal to a 9 is the combination with a 1001. Two hexadecimals define an eight bit register. The first four bits in the 8-bit COMMAND register for the SET MAX CYL command equal the hexadecimal F and the second four bits the 8-bit COMMAND register for the SET MAX CYL command equal the hexadecimal 9. Thus, the SET MAX CYL command is termed an F9 command.

RESPONSE TO THE SET MAX CYL Command

If the SET MAX CYL command is considered valid, the new parameters are passed to the firmware of the disk drive device. The disk drive device returns the parameters to the host, as shown in step 80 of FIG. 2B. The returned parameters are set forth in the RESPONSE TO THE SET MAX CYL command. The RESPONSE TO THE SET MAX CYL command is in the format of any ATA command block which is a matrix of eight, 8-bit registers. As shown in FIG. 8, the command block input registers for the RESPONSE TO THE SET MAX CYL command include eight, 8-bit registers called DATA, ERROR, SECTOR COUNT, SECTOR NUMBER, CYLINDER LOW, CYLINDER HIGH, DEVICE/HEAD, and STATUS.

Bits in the DATA, ERROR, SECTOR COUNT registers are not used to set parameters for the RESPONSE TO THE SET MAX CYL command and therefore are not initialized. The drive parameters are conveyed by bits in the SECTOR NUMBER, CYLINDER LOW, CYLINDER HIGH, and DEVICE/HEAD 8-bit registers. The bits in these 8-bit registers convey the parameters for a particular Sector Number, a particular cylinder for Cylinder Low and a particular cylinder for Cylinder High. The bits of the DEVICE/HEAD register are used to convey parameters about the type of drive (slave or master) and the mode in which the drive operates (LBA mode is Logical Address Block mode).

The ERROR REGISTER/Field

Bits in the 8-bit ERROR Register may also be used in the event an error is detected. The last four bits of the ERROR Register are used when an error is detected while executing the SET MAX LBA/CYL command. The ERROR Register is not shown in FIG. 7, but are detailed in FIG. 9. Each of the bits in the ERROR Register indicates the type of error as is shown in FIG. 9.

The STATUS REGISTER/Field

Bits in the 8-bit STATUS register change while the RESPONSE TO THE SET MAX LBA/CYL command are is being filled and as different parameters in other registers are being filled. The host polls the STATUS register as the command is being filled. The bits in the 8-bit STATUS register convey information about which of the parameters has returned and if all the parameters necessary to fulfill the the RESPONSE TO THE SET MAX LBA/CYL command have been returned. The 8-=bit STATUS register is shown blank in FIG. 7, but is detailed in FIG. 10. Each of the bits in the STATUS register indicates the type of status as is shown in FIG. 10.

Once the SET MAX LBA/CYL command is received and the drive parameters are modified, then all accesses beyond the Logical Block Address or Cylinder designated by this command are rejected. Upon rejecting the access a bit in the ERROR register indicates an abort.

Listed below are various parameters associated with the SET MAX LBA/CYL command and the RESPONSE TO THE SET MAX LBA/CYL command. The parameters associated with the SET MAX LBA/CYL command are listed as Output Parameters to the Drive.

The parameters associated with the RESPONSE TO THE SET MAX LBA/CYL command are the remaining parameters listed. Specifically, the parameters associated with the RESPONSE TO THE SET MAX LBA/CYL command are the Input Parameters from the Drive, parameters associated with the Error Registers, and parameters associated with the Status registers.

Output Parameters to the Drive

| | |
|---|---|
| B | Option bit for selection whether nonvolatile or volatile. B=1 is volatile condition, when B=1, Max LBA/CYL which is set by SET MAX LBA/CYL command is preserved by POR, HARD RESET and SOFT RESET. When B=0, MAX LBA/CYL which is set by SET MAX LBA/CYL command will be lost by PER, HARD RESET and SOFT RESBT. |
| Sector Number | In LBA mode, this register contains LBA bits 0 → 7 which is to be set. (L=1) In CHS mode, this register is ignored. (L=0) |
| Cylinder High/LOW | In LBA mode, this register contains LBA bits 8 → 15 (low), 16 → 23 (high) which is to be set, (L=1) In CHS mode, this register contains cylinder number which is to be set, (L=0) |
| DEVICE/HEAD | In LBA mode, this register contains LBA bits 24 → 27 which is to set (L=1) In CHS mode, this register is ignored. (L=0) |
| L | LBA mode, indicates the addressing mode, L=0 specifies CHS mode and L=1 does LBA addressing mode. |
| D | Drive. When D=0, the drive 0 (master) is selected, when D=1 drive 1 (slave) is selected. |
| V | Valid. Indicates that the bit is part of an output parameter and should be specified. |
| — | Indicates that the bit is not used. |

Input Parameters From The Drive

| | |
|---|---|
| Sector Number | In LBA mode, this register contains max LBA bits 0 → 7 which is set. (L=1) In CHS mode, this register contains max sector number. (L=0) |
| Cylinder High/Low | In LBA mode, this register contains max LBA bits 8 → 15 |

-continued

| | |
|---|---|
| | (Low), 16 → 23 (HIGH) which is set. (L=1) In CHS mode, this register contains max cylinder number which is set. (L=0) |
| DEVICE/HEAD which is set. (L=1) | In LBA mode, this register contains max LBA bits 24 → 27 In CHS mode, this register contains max head number. (L=0) |
| V | Valid. Indicates that the bit is part of an output parameter and should be specified. |
| — | Indicates that the bit is not used. |

Error Registers

| | |
|---|---|
| ABT | Aborted command. ABT=1 indicates the requested command has been aborted due to a drive status error or an invalid parameter in an output register. |

Status Registers

| | |
|---|---|
| RDY | Drive ready. RDY=1 indicates that the drive is capable of responding to a command. RDY will be set to 0 during power on until the drive is ready to accept a command. If the drive detects an error while processing a command, RDY is set to 0 until the Status Register is read by the Host, at which the RDY is set back to 1. |
| ERR | Error. ERR=1 indicates that an error occurred during execution of the previous command. The Error Register should be read to determine the error type. The drive sets ERR=0 when the next command is received from the host. |

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for changing the size of a reserve area on a disk in a disk drive, said disk drive manufactured with a predetermined reserve storage area for storing selected non-user accessible information, said reserve storage area having a predetermined storage capacity, said disk drive also including a user accessible area having a predetermined storage capacity, said reserve area and said user accessible area comprising the total storage capacity of the disk drive, the method for adding to the reserve area comprising the steps of:

executing a first command to read the maximum track to which the user has access; and executing a second command for increasing or reducing a portion of the user accessible area to additional reserve area;

inputting non-user accessible information to the added reserve area, wherein the step of inputting non-user accessible information to the added reserve area includes adding a set of virus scan instructions to the added reserve area.

2. The method for changing the size of a reserve area on a disk in a disk drive of claim 1 wherein the step of inputting virus scan instructions to the added reserve area includes adding the instruction step of periodically scanning the disk for viruses.

3. The method for changing the size of a reserve area on a disk in a disk drive of claim 1 wherein the step of inputting virus scan instructions to the added reserve area includes adding the instruction step of scanning information to be written on the disk for viruses before the information is stored to the disk.

4. The method for changing the size of a reserve area on a disk in a disk drive of claim 1 wherein the step of inputting non-user accessible information to the added reserve area includes adding a set of instructions to the added reserve area to predict a disk drive failure.

5. The method for changing the size of a reserve area on a disk in a disk drive of claim 1 wherein the step of inputting non-user accessible information to the added reserve area includes adding a portion of the basic input output system (BIOS) instruction set to the added reserve area.

6. The method for changing the size of a reserve area on a disk in a disk drive of claim 1 wherein the step of inputting non-user accessible information to the added reserve area includes adding emergency boot instructions to the added reserve area.

7. The method for changing the size of a reserve area on a disk in a disk drive of claim 1, wherein said disk drive further includes, a microcontroller and a Read Only Memory with a firmware instruction set for operating the microcontroller, said first command being executed after a password is recognized by the firmware.

8. The method for changing the size of a reserve area on a disk in a disk drive of claim 7 wherein the step of issuing the first command includes sending a password to the disk drive, wherein the firmware recognizes the password and allows execution of the second command.

9. A computer system comprising:
   a bus for passing commands and data to components communicatively attached to the bus;
   a microcontroller communicatively attached to the bus;
   a memory communicatively attached to the bus;
   an input/output controller communicatively attached to the bus; and
   a disk drive having a disk with non-user accessible area and user accessible area, said disk drive attached to the input/output controller, said microcontroller capable of sending commands over said data bus via said input/output controller to change the amount of non user accessible area on the disk drive, wherein the disk drive is capable of executing another command from said microprocessor to convert user accessible area on the disk to non-user accessible area on the disk and to input non-user accessible information to the added non-user accessible area.

10. A computer system comprising:
    a bus for passing commands and data to components communicatively attached to the bus;
    a microcontroller communicatively attached to the bus;
    a memory communicatively attached to the bus;
    an input/output controller communicatively attached to the bus; and
    a disk drive attached to the input/output controller, said microcontroller capable of sending commands over said data bus via said input/output controller to change the amount of non user accessible area on a disk drive, wherein the microcontroller is capable of sending a password to the disk drive, wherein the command to change the amount of non user accessible area on a disk drive is executed when the password is correct and wherein non-user accessible information is added after the size of the non-user accessible area is changed.

11. A disk drive communicatively coupled to a host computer, said disk drive having a maximum addressable logical block address, and having a reserve area for storing information unavailable to a user, said disk drive comprising:
    an interface between the disk drive and a host computer;
    a first apparatus recognizing a command sent over the interface by said host computer to reduce the maximum addressable logical block address to allow an increase in the size of the reserve area;
    a second apparatus for increasing the amount of disk space devoted to a reserve area for storing information unavailable to a user of the host computer and for inputting non-user accessible information to the added reserve area; and
    a third apparatus for checking some disk parameters to determine the amount of user accessible area on the disk convertible to reserve area on the disk and vice versa.

12. A method for changing the size of a reserve area on a disk in a disk drive, said disk drive manufactured with a predetermined reserve storage area for storing selected non-user accessible information, said reserve storage area having a predetermined storage capacity, said disk drive also including a user accessible area having a predetermined storage capacity, said reserve area and said user accessible area comprising the total storage capacity of the disk drive, the method for adding to the reserve area comprising the steps of:
    executing a first command to read the maximum track to which the user has access;
    executing a second command for changing a portion of the user accessible area to additional reserve area; and
    inputting non-user accessible information to the added reserve area, wherein the step of inputting non-user accessible information to the added reserve area includes adding a set of instructions to the added reserve area to predict a disk drive failure.

13. A method for changing the size of a reserve area on a disk in a disk drive, said disk drive manufactured with a predetermined reserve storage area for storing selected non-user accessible information, said reserve storage area having a predetermined storage capacity, said disk drive also including a user accessible area having a predetermined storage capacity, said reserve area and said user accessible area comprising the total storage capacity of the disk drive, the method for adding to the reserve area comprising the steps of:
    executing a first command to read the maximum track to which the user has access;
    executing a second command for changing a portion of the user accessible area to additional reserve area; and
    inputting non-user accessible information to the added reserve area, wherein the step of inputting non-user accessible information to the added reserve area includes adding a portion of the basic input output system (BIOS) instruction set to the added reserve area.

14. A method for changing the size of a reserve area on a disk in a disk drive, said disk drive manufactured with a predetermined reserve storage area for storing selected non-user accessible information, said reserve storage area having a predetermined storage capacity, said disk drive also including a user accessible area having a predetermined storage capacity, said reserve area and said user accessible area comprising the total storage capacity of the disk drive, the method for adding to the reserve area comprising the steps of:

executing a first command to read the maximum track to which the user has access;

executing a second command for changing a portion of the user accessible area to additional reserve area; and inputting non-user accessible information to the added reserve area, wherein the step of inputting non-user accessible information to the added reserve area includes adding emergency boot instructions to the added reserve area.

15. A method for changing the size of a reserve area on a disk in a disk drive, said disk drive manufactured with a predetermined reserve storage area for storing selected non-user accessible information, said reserve storage area having a predetermined storage capacity, said disk drive also including a user accessible area having a predetermined storage capacity, said reserve area and said user accessible area comprising the total storage capacity of the disk drive, the method for adding to the reserve area comprising the steps of:

executing a first command to read the maximum track to which the user has access; and executing a second command for changing a portion of the user accessible area to additional reserve area, wherein said disk drive further includes, a microcontroller and a Read Only Memory with a firmware instruction set for operating the microcontroller, said first command being executed after a password is recognized by the firmware.

* * * * *